United States Patent [19]

Gautier et al.

[11] Patent Number: 4,540,448

[45] Date of Patent: Sep. 10, 1985

[54] MICROEMULSION-BASED ACID COMPOSITION AND ITS USES, PARTICULARLY FOR CLEANING OPERATIONS

[75] Inventors: Jean C. Gautier, Billere; Jacques Kamornicki, Lescar, both of France

[73] Assignee: Societe Nationale Elf Aquitaine, France

[21] Appl. No.: 591,512

[22] Filed: Mar. 21, 1984

[30] Foreign Application Priority Data

Mar. 24, 1983 [FR] France ............... 83 04824

[51] Int. Cl.$^3$ .................... C11D 1/34; C11D 3/43; C23F 7/08; C23G 1/04

[52] U.S. Cl. .................... 148/6.15 R; 134/3; 134/40; 134/41; 148/6.15 Z; 252/136; 252/142; 252/144; 252/174.16; 252/309; 252/DIG. 14; 252/DIG. 17

[58] Field of Search .......... 252/8.55 C, 8.5 P, 8.55 D, 252/309, 136, 142, 174.16; 134/3, 40, 41; 148/6.15 R, 6.15 Z

[56] References Cited

U.S. PATENT DOCUMENTS

| | | | |
|---|---|---|---|
| 2,408,155 | 9/1946 | Thornbury | 252/143 |
| 2,832,706 | 4/1958 | Toubes | 148/6.15 |
| 2,886,477 | 5/1959 | Smith | 252/143 |
| 2,986,482 | 5/1961 | Sharp | 252/136 |
| 3,306,785 | 2/1967 | Hitchcock | 148/6.15 Z |
| 3,435,898 | 4/1969 | Thompson | 166/274 |
| 3,450,577 | 6/1969 | Beach | 148/6.15 |
| 3,470,958 | 10/1969 | Kinney | 166/305 R |
| 3,540,532 | 11/1970 | Davis | 252/8.55 D |
| 3,596,715 | 8/1971 | Halbert | 166/274 |
| 3,620,303 | 11/1971 | Halbert | 166/272 |
| 3,704,751 | 12/1972 | Tate | 166/307 |
| 3,719,229 | 3/1973 | Tate | 252/8.55 D |
| 3,754,599 | 8/1973 | Hummel | 166/297 |
| 3,831,679 | 8/1974 | Presley | 166/307 |
| 3,925,229 | 12/1975 | Bolsing | 252/136 |
| 4,008,101 | 2/1977 | Rowe | 148/6.15 R |
| 4,143,205 | 3/1979 | Rowe | 428/46.9 |
| 4,247,424 | 1/1981 | Kuzel | 252/528 |
| 4,278,129 | 7/1981 | Walton | 252/8.55 B |
| 4,371,447 | 2/1983 | Webb | 252/73 |
| 4,390,465 | 6/1983 | Spekman | 252/527 |

FOREIGN PATENT DOCUMENTS

| | | | |
|---|---|---|---|
| 778901 | 7/1957 | United Kingdom | 252/136 |
| 2074043 | 10/1981 | United Kingdom | |

OTHER PUBLICATIONS

Bennett, H., Editor, *The Chemical Formulary*, vol. X, p. 111.

*Primary Examiner*—Dennis L. Albrecht
*Attorney, Agent, or Firm*—Ostrolenk, Faber, Gerb & Soffen

[57] ABSTRACT

Composition comprising a hydrophobic liquid, an aqueous acid solution, a surfactant agent and a cosurfactant, a microemulsion being formed between the hydrophobic liquid and the aqueous solution; the surfactant comprises one or more surface-active phosphoric esters.

Applications to the cleaning of greasy surfaces, scouring, passivation and phosphatizing, such operation being effected, if desired, in a single step without preliminary degreasing.

18 Claims, No Drawings

MICROEMULSION-BASED ACID COMPOSITION AND ITS USES, PARTICULARLY FOR CLEANING OPERATIONS

The present invention relates to a new composition of an acid character, which is a microemulsion containing a hydrophobic organic liquid and an aqueous solution of an acid. It also relates to the use of this composition and in particular to cleaning, scouring and/or degreasing of various surfaces. Among these applications, the anticorrosion treatment of ferrous metal surfaces occupies an important place.

Attempts have already been made to prepare and utilize acid microemulsions, which are useful for certain purposes. This applies to U.S. Pat. Nos. 3,754,599 and 3,831,679, which describe the preparation of micellar dispersions of certain mineral acids in hydrocarbons. This prior technique is based upon the use of anionic surface-active agents, particularly to the sulphonate type. Experience has shown that these dispersions leave much to be desired, apparently because of reaction of the acid with the salt of the alkali metal forming the surface-active agent and also because of precipitation of the solids which are then produced. A marked advance in this field was made by the use of surface-active agents having a quaternary ammonium function, that is cationic agents, as described in French Patent Publication No. 2480620. Various types of microemulsions of good stability can thus be obtained, suitable for various uses, such as liquid-liquid extractions of metallic cations and the catalysts of reactions involving alkylation, hydrolysis, esterification, polymerization, isomerization and others, which require an acid medium. Microemulsions of this kind, comprising a hydrocarbon and an aqueous solution of an acid, are also suitable for the stimulation of oil-wells and the cleaning and scouring of various surfaces. However, as quaternary ammonium surfactants must be employed, in certain cases, in relatively high concentrations, e.g. greater than 15%, and as their cost is by no means negligible, the question arises as to whether—despite their advantages—they could not be replaced by others. Also, commercial quaternary ammonium compounds are generally halogenated, which can be unfavourable from the standpoint of corrosion in the case of treatment of metals. There is thus a need to seek microemulsion compositions which have the advantages of those of Publication No. 2480620, while also being more economical and, necessarily, free from halogens.

The present invention results from this search. It allows all the uses noted above to be carried out in an economical fashion and, moreover, with the considerable advantage of enabling the scouring and/or passivation of a greasy metal surface in a single operation, without preliminary degreasing. Contrary to the known art, which first requires degreasing of the surface with the aid of detergents and/or organic solvents, followed by rinsing, prior to treatment with an aqueous acid solution, the new composition according to the invention allows, at the same time, removal of the greasy film covering the surface and scouring and/or passivation of this surface. This possibility has considerable interest, in particular in the preparation of metal sheets before painting.

The new composition according to the invention, which comprises a hydrophobic liquid, an aqueous acid solution and a surface-active agent comprising one or more phosphoric esters, is characterized by also containing a cosurfactant agent in a proportion suitable for the composition to form a microemulsion.

The phosphoric ester or esters utilizable according to the invention are compounds which result from esterification of one, two or three of the acid functions of $H_3PO_4$, by a terminal hydroxyl group on a polyalkoxy chain, which can carry at its other end an alkyl, alkenyl or aryl group.

The monoester can be represented by the general formula:

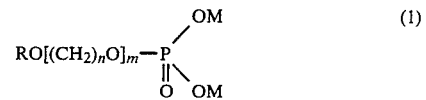

where R is an alkyl or alkenyl group, generally $C_1$ to $C_{30}$ and preferably $C_6$ to $C_{18}$, or a phenyl group, which can if desired carry alkyl substituents; n is an integral number from 1 to 6 and principally 2 to 4, while the integral number m can range from 2 to 15 and preferably from 3 to 10. The M's designate cations, which generally are H, Na, K or $NH_4$, but can equally be alkaline earths, Zn or others.

In the diester, one M of formula (1) is a second alkoxyl chain $RO[(CH_2)_nO]_m$, in which R, n and m are not necessarily the same as those in the first chain.

The triester carries three oxyaliphatic chains, $RO[(CH_2)_nO]_m$— and consequently includes no M.

While the various surfactant phosphoric esters defined above can be utilized individually, in practice use is generally made of mixtures of the mono-, di- and triesters, especially the first two having polyoxyalkyl groups with different R groups, derived from industrial manufacture using fatty acids of whole oils or greases, for example coprah, tallow, colza, etc. Thus, for example, when R is derived from coprah fatty acids (coconut oil), a mixture of esters can be obtained, in which in about 3% R is $C_8$, in 6%, $C_{10}$; in 56%, $C_{12}$; in 18%, $C_{14}$; in 10%, $C_{16}$; in 2%, $C_{18}$ (stearyl) and in 5%, $C_{18}$ (oleyl).

Where R is an aryl group, it is useful for it to carry linear substituents extending the polyalkoxy chain. Thus, the ester can advantageously have the structure

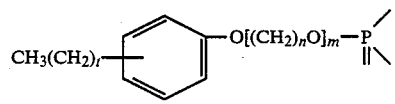

t preferably being an integral number from 1 to 8.

In the compositions according to the invention, 3% to 15% and most preferably 5% to 12% by weight of the phosphoric surface-active ester is generally sufficient to create an aqueous acid microemulsion in the hydrophobic liquid. By varying the proportions and nature of the materials present, however, it is possible to form any of the other types of microemulsion (oil-in-water or bi-continuous).

As regards the other constituents of the composition according to the invention, they can be selected from those of the prior art utilized in the preparation of microemulsions. This is notably the case with the cosurfactant agents which must accompany the surfactant itself; these additives can be alcohols, ketones, ethers, diols and their ether derivatives of glycol esters, glycol ethers, such as butyl acetate glycol ether, esters of organic acids, glycerol ether sulphonates, amides, mono and diesters of phosphoric acid, sulphoxides, salts of amines or quaternary organic bases etc. As in the prior art, the mono and di-alcohols from $C_4$ to $C_{12}$ appear to be both economical and technically advantageous.

The process which leads to the production of the new compounds according to the invention is applicable to very diverse hydrophobic liquids, including hydrocarbons, halogenated hydrocarbons, vegetable oils, esters immiscible with water, higher alcohols etc. Hydrocarbons include not only paraffins, olefins, naphthenes, aryl compounds and various crude oil fractions, but also polynuclear oils, such as the anthracenic oils and others. Current chlorinated solvents containing $C_1$ to $C_4$ are especially suitable, which is highly practical in comparison with other processes using microemulsions in acid media. This permits use of the compositions with excellent results for degreasing operations, simultaneously with scouring and phosphatizing of ferrous metal workpieces, an operation which is very difficult or even impossible with compositions according to the prior art.

Apart from acids having a marked chemical activity, being oxidizing or otherwise, for example chloric, bromic, concentrated nitric, nitrous, chromic or trichloracetic acids, all others which are inert to the constituents of the composition can be employed. Hydrochloric, hydrobromic, hydrofluoric, perchloric, sulphuric, sulphurous, phosphoric and boric acids, $H_3PO_4$—$BF_3$, $BF_3$—HF, $NH_4F$—HF etc., can also be used, in particular, as well as a large number of organic acids, such as acetic, propionic, alkyl and aryl-sulphonic, butyric, oxalic, phosphonic acids and many others.

Applications using phosphoric acid are of particular interest within the scope of this invention. They lead to the unexpected result, mentioned above, that it becomes possible, in a single operation, to treat iron or steel workpieces in order to degrease and phosphatize them with a view to subsequent painting.

In a general manner, the proportions of the constituents of the new compositions according to the invention are similar to those of the known art; there are preferred limits, however, for obtaining microemulsions which are particularly suitable for certain applications. Thus, for cleaning products, particularly for simultaneous degreasing and scouring, it is preferable to keep to the following proportions. With an aqueous phase rich in $H_3PO_4$, particularly 20% to 85% thereof, the best results are obtained where the percentages by weight are within the limits:

acid phase, aqueous—20 to 45%,
organic phase, hydrophobic—35 to 65%,
cosurfactant agent—4 to 13%,
surfactant (EPT)—4 to 13%.

and the best weight ratios between the aqueous and hydrophobic phases are from 0.5 to 1.

In the case of hydrochloric acid, the recommendable limits are:

acid phase, aqueous—18 to 30%,
organic phase, hydrophobic—30 to 47%,
cosurfactant agent—5 to 23%,
surfactant (EPT)—13 to 28%.

Here again the preferred ratio of aqueous phase/organic phase is from 0.5 to 1; ratios around 1 require additional surfactant.

In the non-limitative Examples which follow, the initials EPT indicate surfactants constituted by the esters described above and illustrated by the formula (1).

The three products EPT-1, -2 and -3 represent respectively the following compositions.

EPT-1: substantially equimolar mixture of mono- and di-esters, in which R designates the aliphatic groups of the fatty acids of coprah, that is predominantly lauryl ($C_{12}$) and myristyl ($C_{14}$), the distribution of which is as indicated above, in the present description;

n is equal to 2 and the average of m is 7;
M is Na.

EPT-2: constituted by 1 mole of monoester

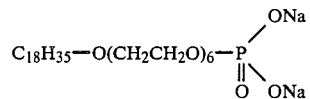

where $C_{18}H_{35}$ is oleyl, and 1 mole of the corresponding diester, in which a second chain $C_{18}H_{35}$—$O(CH_2CH_2O)_6$— replaces one Na.

EPT-3: comprises about 25% phosphoric monoester, 50% diester and 25% triester, the polyalkoxyl chain carrying at R the n-nonylphenol group:

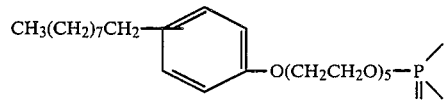

EXAMPLES 1 AND 2

Compositions suitable for the treatment of metal sheets before painting or for cleaning refinery exchangers.

The aqueous phase is formed by 85% by weight orthophosphoric acid (Example 1) or diluted with water to a content of 21% (Example 2). The hydrophobic liquid is trichloroethane. The microemulsions obtained, stable up to 80° C., are constituted as follows:

|  | % by weight: | |
|---|---|---|
|  | Example 1 | Example 2 |
| Aqueous phase: | | |
| 85% phosphoric acid | 30.3 | 6.7 |
| water | — | 20.2 |
| Hydrophobic phase: trichloroethane | 60.5 | 53.7 |
| Cosurfactant: 2-ethylhexanol | 4.6 | 9.7 |
| Surfactant: EPT-1 | 4.6 | 9.7 |

Stable and effective compositions have been obtained by replacing the 2-ethylhexanol with the butyl ether of ethylene glycol or with decanol and for various acidities.

Also, similar microemulsions have been prepared with, as the surfactant, EPT-2 or EPT-3 in place of EPT-1; the maximum EPT-2 content was 11.1%. The same results are obtained with proportions of materials between those of Examples 1 and 2. In compositions intended for the phosphatizing of sheet metal simultaneously with degreasing, use is made of an aqueous phase containing at least 500 ppm of Zn salt, which as is kown facilitates phosphatizing.

EXAMPLES 3 AND 4

Compositions useful for cleaning conduits and oil refinery apparatus

85% phosphoric acid is employed with the addition of water, the ratio of aqueous phase/hydrophobic phase being 1.

|  | % by weight: | |
|---|---|---|
|  | Example 3 | Example 4 |
| 85% phosphoric acid | 32.15 | 9.50 |
| Water | 9.55 | 29.05 |
| Perchlorethylene | 41.70 | 38.60 |
| 2-Ethylhexanol | 4.17 | 10.10 |
| Decanol | 4.17 | — |
| Surfactant: EPT-2 | 8.35 | — |
| EPT-3 | — | 12.60 |

EXAMPLES 5 TO 8

Composition for degreasing and scouring with hydrochloric acid

The aqueous acid phase is constituted by a solution of 28% by weight HCl in water.

|  | % by weight: | | | |
|---|---|---|---|---|
| Examples: | 5 | 6 | 7 | 8 |
| Aqueous acid phase | 18.2 | 30 | 31.6 | 34.9 |
| Gas oil | 36.4 | — | — | — |
| Trichloroethane | — | 30 | 42.1 | 46.5 |
| 2-Ethylhexanol | 11.4 | 12 | 7.8 | — |
| Octanol | — | — | — | 5.6 |
| Decanol | 11.4 | — | — | — |
| Surfactant EPT-2 | — | 28 | 9.0 | — |
| EPT-3 | 22.7 | — | 9.5 | 13 |

The microemulsions so formed are stable and give good results, but generally require more surfactant than the phosphoric compositions of the foregoing Examples.

EXAMPLES 9 TO 11

Degreasing and phosphatizing of sheet metal

Three series of samples of sheets of greasy iron, derived from the works, are treated with three compositions coated upon them with a roller, for simultaneous degreasing and phosphatizing of these sheets. The samples were examined each hour as regards the degree of degreasing.

The compositions were formed by weight from:
21.5% of an aqueous 50% solution of $H_3PO_4$ (to 1000 ppm of zinc)
43.0% of white spirit
24.0% of butyl ethylene glycol
11.5% of a surfactant agent.

These microemulsions differ from one another only by the nature of the surfactant, indicated in the results table below. The degrees of degreasing observed were:

| Examples Nos: | 9 | 10 | 11 |
|---|---|---|---|
| Surfactant: | sodium lauryl sulphate | lauryl trimethyl ammonium chloride | EPT-1 |
| Degreasing: | | | |
| after 1 hour | very poor | poor | insufficient |
| after 2 hours | poor | poor | good |
| after 3 hours | partial | insufficient | complete |

It will be seen that the phosphoric ester surfactant (EPT-1) permits degreasing of the sheets much more rapidly than the agents of the known art.

EXAMPLES 12–14

Degreasing and phosphatizing of sheets

Analogous tests to those of Examples 9 to 11 are effected with trichloroethane in place of white spirit.

Also, after treatment, the sheets are rinsed with water, dried and then painted with a glycerophthalic resin. In the manner known in the art, adherence of the paint film was then tested by the method of subdivision, using a stylus into squares of 1 mm side. The percentage of squares where the film pulled away is indicated in the results table below:

Composition utilized:
25.90% of an aqueous 65% solution of $H_3PO_4$ (to 1000 ppm of zinc)
51.90% of trichloroethane
9.25% of decanol
11.10% surfactant agent
1.85% of monobutyl ether of ethylene glycol (or butyl glycol)

| Example No. | 12 | 13 | 14 |
|---|---|---|---|
| Surfactant: | sodium lauryl sulphate | lauryl trimethyl ammonium chloride | EPT-1 |
| Degreasing: | | | |
| after 1 hour | poor | poor. | quite good |
| after 2 hours | poor | insufficient | complete |
| after 3 hours | partial | passable | — |
| after 4 hours | passable | good | — |
| Adherence: % detachment | 40 | 22 | 0 |

The advantage of the phosphoric ester based surfactant is thus confirmed and, also, the special combination, employing a phosphoric acid microemulsion in a chlorinated solvent with a phosphoric ester surfactant, gives the following surprising results.

During application of the microemulsion to the sheet, very good wetting is observed which leads to a uniform treatment of the sheet; rinsing with water accompanied by elimination of a greasy film permits visual control of the operation and, if required, detection of any non-treated areas, which would constitute sources of corrosion subsequently; the sheet thus treated can remain in the free air for several days without undergoing corrosion.

On the other hand, as the table above shows, treatment of sheets with microemulsions according to the invention permits excellent adherence of paint to the metallic plates.

EXAMPLE 15

Cleaning of a petroleum refinery heat exchanger

The hydrochloric acid microemulsion of Example 8 permits complete cleansing of the exchanger surfaces of this apparatus in 3 hours at 50° C., although an entire day is required to effect this by first degreasing with a chlorinated solvent and then treating with an aqueous HCl solution. This result is confirmed by laboratory tests, where a fragment of 2 g of Champagne limestone (87% $CaCO_3$) is previously coated with crude oil. Immersed in the composition of Example 8, this fragment gives rise to a release of $CO_2$ in the following total volumes:

40 ml after 15 minutes
150 ml after 1 hour
205 ml after 2 hours
250 ml after 3 hours giving a total of 390 ml evolved from the carbonate treated. Thus 64% of the latter has been attacked.

In a parallel test, after washing the greasy fragment with trichloroethane and immersion in a solution of 28% HCl, no evolution of gas took place after 2 hours of contact.

We claim:

1. A microemulsion capable of simultaneously degreasing and scouring a metal substrate comprising, by weight, 18–45% of aqueous acid, 30–65% of liquid hydrocarbon or chlorocarbon, 4–23% of a 4 to 12 carbon atom mono- or dihydric alcohol and 4–28% of one or a mixture of phosphoric acid esters of the formula

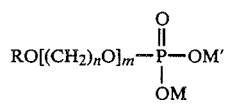

in which M is selected from the group consisting of hydrogen, sodium, potassium, ammonium, alkaline earth metal and zinc, M' is M or $RO[(CH_2)_nO]_m-$, wherein each individual R is phenyl or alkenyl of 1–30 carbon atoms, each individual n is 1–6 and each individual m is 2–15.

2. The microemulsion of claim 1, wherein each R has 6–18 carbon atoms, each n is 2–4 and each m is 3–10.

3. The microemulsion of claim 2, wherein the acid is hydrochloric acid or phosphoric acid and M' is M.

4. The microemulsion of claim 2 in which the acid is hydrochloric acid or phosphoric acid, and M' is $RO[(CH_2)_nO]_m-$.

5. The microemulsion of claim 2 containing a mixture of said phosphoric esters.

6. A method of simultaneously degreasing and scouring a metal substrate comprising contacting the substrate with a microemulsion, separating the substrate and the microemulsion and rinsing the substrate with water, wherein the microemulsion contains, by weight, 18–45% aqueous acid, 30–65% liquid hydrocarbon or chlorocarbon, 4–23% of a 4 to 12 carbon atom mono- or dihydric alcohol and 4–28% of one or a mixture of phosphoric acid esters of the formula

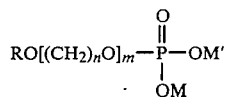

in which M is selected from the group consisting of hydrogen, sodium, potassium, ammonium, alkaline earth metal and zinc, M' is M or $RO[(CH_2)_nO]_m-$, each individual R is alkyl or alkenyl of 1–30 carbon atoms, phenyl or alkylphenyl, each individual n is 1–6 and each individual m is 2–15.

7. The method of of claim 6, wherein each R has 6–18 carbon atoms, each n is 2–4 and each m is 3–10.

8. The method of claim 6, wherein M' is M.

9. The method of claim 8, wherein the microemulsion contains 18–30% of aqueous hydrochloric acid, 30–47% of hydrocarbon or chlorocarbon, 5–23% of 4–12 carbon atom alcohol and 13–28% of said phosphoric esters.

10. The method of claim 9, in which the metal substrate is a ferrous metal which is phosphatized simultaneously the degreasing and scouring, the microemulsion containing 20–45% of aqueous 20–85% phosphoric acid, 35–65% of hydrocarbon or chlorocarbon, 4–33% of 4–12 carbon atom alcohol and 4–13% of said phosphoric esters, the weight ratio of the aqueous acid to the hydrocarbon or chlorocarbon being 0.5–1.

11. The method of of claim 10, wherein the R moieties are derived from coprah fatty acids.

12. The method of claim 9, in which the R groups are derived from coprah fatty acids.

13. The method of claim 8, in which M' is $RO[(CH_2)_nO]_m-$.

14. The method of claim 13, in which the microemulsion contains 18–30% of aqueous hydrochloric acid, 30–47% of hydrocarbon or chlorcarbon, 5–23% of 4–12 carbon atom alcohol and 13–28% of said phosphoric esters.

15. The method of claim 14, in which the R groups are derived from coprah fatty acids.

16. The method of claim 14, in which the metal substrate is ferrous metal and is phosphatized simultaneously with the degreasing and scoring, the microemulsion containing 20–45% of aqueous 20–85% phosphoric acid, 35–65% of hydrocarbon or chlorocarbon, 4–13% of 4–12 carbon atom alcohol and 4—13% of said phosphoric esters, the weight ratio of the aqueous phosphoric acid to the hydrocarbon or chlorocarbon being 0.5–1.

17. The method of claim 16, in which the R groups are derived from copra fatty acids.

18. The method of claim 6, in which the phosphoric esters are a mixture of

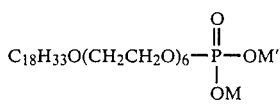

and

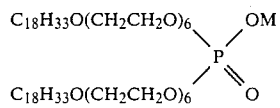

* * * * *

UNITED STATES PATENT AND TRADEMARK OFFICE
CERTIFICATE OF CORRECTION

PATENT NO. : 4,540,448
DATED : September 10, 1985
INVENTOR(S) : Jean-Claude Gautier It is certified that error appears in the above-identified patent and that said Letters Patent is hereby corrected as shown below:

On the Title Page:

In the headings section [75] for "Kamornicki" read
--Kormornicki--.

Signed and Sealed this

Eighth Day of September, 1987

Attest:

DONALD J. QUIGG

Attesting Officer

Commissioner of Patents and Trademarks